United States Patent [19]

Hölzer et al.

[11] 4,298,203
[45] Nov. 3, 1981

[54] TWO PART SHAFT SEALING RING

[75] Inventors: Helmut Hölzer; Ernst M. von Arndt, both of Weinheim, Fed. Rep. of Germany

[73] Assignee: Firma Carl Freudenberg, Weinhem, Fed. Rep. of Germany

[21] Appl. No.: 208,037

[22] Filed: Nov. 18, 1980

[30] Foreign Application Priority Data

Dec. 12, 1979 [DE] Fed. Rep. of Germany ....... 2949838

[51] Int. Cl.³ .............................................. F16J 15/32
[52] U.S. Cl. ..................................... 277/152; 277/181; 277/189
[58] Field of Search ................ 277/152, 153, 181, 189

[56] References Cited

U.S. PATENT DOCUMENTS

| 2,672,359 | 3/1954 | Fisher et al. | 277/153 |
| 2,898,167 | 8/1959 | Tanner | 277/152 |
| 3,367,666 | 2/1968 | Symons | 277/152 |
| 4,133,542 | 1/1979 | Janian | 277/152 |

FOREIGN PATENT DOCUMENTS 589768 6/1947 United Kingdom ................ 277/152

Primary Examiner—Robert I. Smith
Attorney, Agent, or Firm—Kenyon & Kenyon

[57] ABSTRACT

A two part ring for sealing a shaft against solid, liquid or gas leakage is disclosed. The outer part is a stiffening ring which has a circular projection as its inside diameter surface. The inner part is a lip ring having a circular, concentric slot in its back end face. The projection fits into the slot to concentrically mate the lip and stiffening rings.

21 Claims, 4 Drawing Figures

TWO PART SHAFT SEALING RING

BACKGROUND OF THE INVENTION

The invention relates to a shaft sealing ring consisting of a stiffening ring having a circular projection as its inside diameter surface which extends toward the sealed-off medium, and a lip ring of an elastically resilient material which has a circular slot in its back end face. The slot matches the projection's profile and the projection fits into the slot when these two rings are concentrically mated in operative form as the shaft sealing ring.

The general design of a similar shaft sealing ring is known from DE-GM 74 41 828. However, the profile of the stiffening ring as well as the profile of the lip ring are so complex that the manufacturing costs are undesirably increased. In addition, slight dimensional deviations of the adjacent engaging surfaces of these two parts result in inaccuracies in the assembly and lead to a change of the contact pressures of the sealing lip against the surface of the sealed shaft. The sealing effect is impaired thereby which is undesirable.

OBJECTS OF THE INVENTION

It is therefore an object of the invention to further develop a shaft sealing ring of the projection and slot type in such a manner that it is simple and easy to manufacture and substantially improved sealing is assured.

SUMMARY OF THE INVENTION

These and other objects are met by the shaft sealing ring of the present invention which is composed of an outer stiffening ring having a circular projection as its inside diameter surface and an inner lip ring having a circular slot in its back end face which matches the profile of the projection. The mean diameter of the slot must be smaller than the mean diameter of the projection. The projection fits into the slot to concentrically join the stiffening and lip rings. When in an operating arrangement with a shaft to be sealed, the projection of the stiffening ring joined with the lip ring points toward the sealed off medium. The lip ring has the shape of a hollow cylinder with an inside diameter fitting the outside diameter of the shaft to be sealed. Preferred parameters include a ratio of the depth of the slot to the length of the inside wall of the lip ring of a maximum of 0.6 and a diameter of the projection at a point about midway along its surface which is larger than the diameter of the slot at a corresponding point. The projection and slot preferably are conically tapered. A further preferred parameter includes a conical taper angle of the projection which is identical to or larger than the conical taper angle of the slot.

DETAILED DESCRIPTION OF THE INVENTION

The drawings show, by way of example, embodiments of a shaft sealing ring according to the present invention but are not intended as limitations thereon. Material variations with respect to the sealing of rod feedthroughs, considering the state of the art pertaining thereto are possible without difficulty. The description hereinafter further illustrates the present invention.

Figure 1:
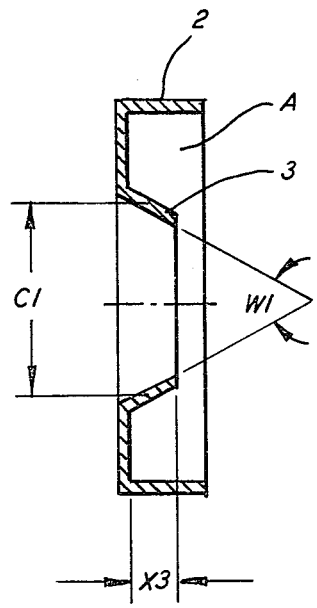
FIG. 1 shows the stiffening ring A in a longitudinal cross-sectional view.

The stiffening ring A of the shaft sealing ring according to the invention, as shown in FIG. 1, normally consists of sheet steel and it is produced by stamping and a subsequent deep-drawing operation. It is also possible to use plastic and employ suitable manufacturing methods if the installation conditions and loads during normal use are exactly known. However, when the conditions and loads are not known, then the use of reinforcement rings of metallic materials is given preference because they are, with greater mechanical strength, free of relaxation phenomena. This, in turn, ensures constant contact pressure of the outside diameter 2, FIG. 1, against the inside diameter of the receiving bore hole of the sealed machine housing over extended periods of time. Constant high contact pressure of the two adjoining surfaces in this area is necessary in order to maintain constant mutual correlation and the required static sealing effect if vibrations are introduced.

The stiffening ring A, FIG. 1, has a U-shaped profile which is open in the axial direction. The opposing surfaces of the projection, 3 of FIG. 1, forming the inside diameter, are conically tapered and enclose a cone angle $W_1$. The frontmost edge of the projection is raised by the dimension $X_3$ above the corresponding inside surface of the stiffening ring A.

The mean diameter $C_1$ of projection 3, FIG. 1, is understood to mean the distance of the centers of gravity of two opposing profile surfaces of the projection, where each profile surface is defined by the inside and outside surface of the projection 3 as well as the surface area within the axial length $X_3$ of the projection.

Figure 2:
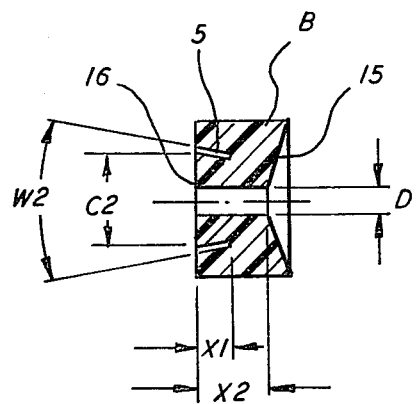
FIG. 2 shows the lip ring B in a longitudinal cross-sectional view in the form in which it exists after cutting from a pre-extruded hose blank and machining.

The lip ring B of the shaft sealing ring according to the invention, as shown in FIG. 2, consists of an elastically resilient material, preferably with a natural or synthetic rubber base. It is produced by the extrusion of a hose from which individual sections according to the length and shape of the lip ring are cut off after the vulcanization. This is understood to mean the cutting to length of the hose on a lathe, whereby an absolutely rotation-symmetrical shape is ensured. It is furthermore important that the two end faces of the individual lip rings be machined only once. The vulcanizing skin, which is important with respect to the wear behavior especially of the inside wall of the lip ring, remains undamaged thereby.

The use of an extrusion process for the manufacture of the bank hose leads to a substantial equalization of the molecular structure of the material of the finished part. Heretofore, corresponding workpieces have been made using molding or die-casting methods in molds. However, the flow processes within the mold were difficult to control, with the result that irregularities in the molecular structure which caused irregularities in the mechanical properties had to be tolerated. For this reason, workpieces for higher grade applications had to be subjected to an individual test. In contrast, the method for the manufacture of the lip ring used in accordance with the invention ensures complete homgeneity of the molecular structure of all individual zones of the lip ring and thereby equalizes mechanical properties as well as causes perfect continuity with respect to the properties and dimensions of successively made lip rings. This method makes the manufacture of especially high-grade shaft sealing rings possible.

Figure 3:
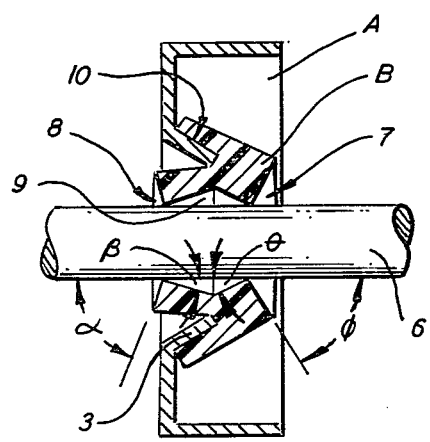
FIG. 3 shows the two parts in a longitudinal cross-sectional view after they are fitted together and includes the sealed shaft.

The ideal angles $\alpha$, $\beta$, $\theta$ and $\phi$ of FIG. 3 which are formed by the front and back end faces and inside wall surfaces defining the sealing lips 7 and 8 of FIG. 3 and the surface of the sealed-off shaft 6 of FIG. 3, are obtained by mutually matching the position and angle of the projection 3, FIG. 3, and those of slot 5 as well as by a corresponding bevel of front end face 15, FIG. 2, and back end face 16, FIG. 2. Bevelling of the end face surfaces is advantageously combined in a single operation with the cutting-off of the lip ring from the tubular blank.

The circular slot 5, FIG. 2, has a width which essentially corresponds to the width of the projection 3, FIG. 1. In a preferred arrangement, the slot's depth $X_1$, FIG. 2, may be slightly greater than the dimension $X_3$, FIG. 1, of the projection. The smallest diameter of the slot 5, FIG. 2, is in any event smaller than the smallest diameter of the projection 3, FIG. 1, whereby an expansion of the lip ring in the region of the slot bottom is obtained during the joining together of the two parts. FIG. 3 shows such an expansion where the inside wall of the lip ring B is lifted from the shaft surface 6 and a void 9 defined by the two sealing lips 7 and 8 is formed. The inside diameter of the two sealing lips corresponds, after the parts A and B are joined together, substantially to the inside diameter D, FIG. 2, of the ring. The two sealing lips 7 and 8, FIG. 3, rest with a corresponding elastic pretension against the surface of the sealed shaft 6, FIG. 3, the contact pressure being produced by matching the shaft diameter to diameter D. The optimum matching for each shaft seal application must be determined experimentally. However, it can be stated generally that matching the dimension D and the diameter of the shaft 6 produces an advantageous adjustment of the contact pressure.

With the advantageous features of the present invention, it is usually not necessary to increase the contact pressure of the sealing lips by applying helical ring springs or similar contact pressure elements. The sealing lips of the shaft sealing ring according to the invention can therefore better follow the vibrations of the sealed shaft and good sealing action may be achieved even under unfavorable conditions. This ability to seal under vibrating conditions is substantially attained by a ratio of at most 0.6 of the depth $X_1$ of the slot 5 of the lip ring to the length $X_2$ of its inside diameter wall. An especially preferred ratio for this purpose is one at most being 0.5 with the qualification that the slot is always made at least so deep that the projection 3 of the stiffening ring is completely taken up.

The projection 3 of the stiffening ring A, FIG. 1, is conically tapered at an angle $W_1$, and the slot of the lip ring B, FIG. 2, is tapered at a second angle $W_2$. Both angles may be identical, but it has been found to be advantageous for sealing purposes if the first angle $W_1$ is larger than the second angle $W_2$. An especially preferred range of ratios of $W_1$ to $W_2$ is from 1 to at most 2. The slot, FIG. 2, of the lip ring is preferably contained in the outer third of the back end face 16, FIG. 2. Its exact location is determined by the mean diameter $C_2$, FIG. 2, which corresponds to the mutual distance of the centers of gravity of two opposite profile areas of the slot. The portion of the lip ring outside the slot is relatively thin, and after the expansion of this portion during the assembly to the stiffening ring, a very flexible joint of the two parts is obtained. Good results may be obtained with an angle $W_1$ of from about 40 to about 48 degrees and preferably about 44 degrees, and with a second angle $W_2$ of from about 20 to about 28 degrees, and preferably about 24 degrees.

The ratio of the mean diameter $C_2$ of the slot 5, FIG. 2, to the mean diameter $C_1$, FIG. 1, of the projection 3 may be at least about 0.9 and preferably at least about 0.95. This ratio determines substantially the setting angle of the sealing lip against the shaft to be sealed, and depending on the specific properties of the sealed-off medium, variations of these preferred $C_2$ to $C_1$ ratios may be employed. Experimental results, however, shown that little change from the preferred ratio is required since they approximate the present variety of setting angles for sealing off different media that are known to those skilled in the art.

Figure 4:
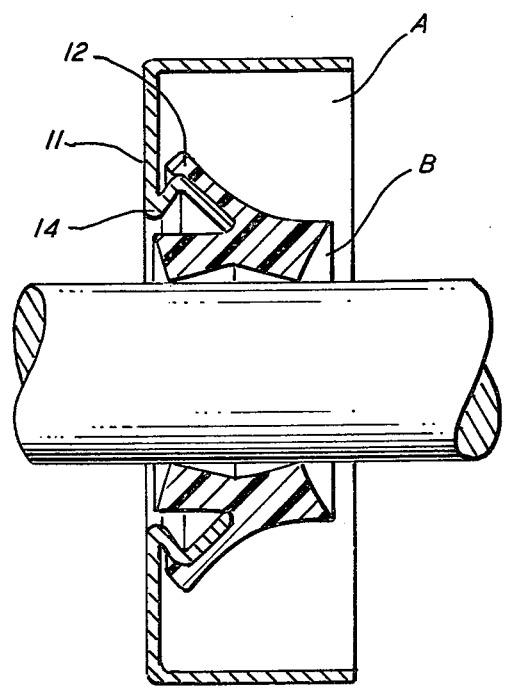
FIG. 4 illustrates in a semi-cross-sectional view another configuration of the two parts joined together.

In order to join the stiffening ring A, FIG. 1, to the lip ring B, FIG. 2, the latter must be expanded elastically in a radial direction particularly in the regions outside the slot and in the region of the slot bottom. This expansion may be advantageously accomplished by means of a press. After the relief of the press load, care must be taken to prevent the lip ring from sliding off the projection 3 which conically tapers toward the front. A practical and preferred means to prevent slippage is to put one or several circular, concentric undercuts on the outside surface of the projection. These will seize the portion of the lip ring outside the slot and prevent slippage. A further improvement to prevent slippage is shown in FIG. 4. In this embodiment the slot 5 has a bead 12 which has a corresponding fitted profile associated with the undercut 11 of projection 3. When the parts are pressed together, the bead then snaps into the undercut 11 and provides through its elastic pressure, contact against the bottom of the slot, a high-grade seal and good anchoring.

In yet another improvement designed to prevent slippage, projection 3 is chemically bonded on its outside surface to the mated surface of the slot 5. Particularly useful in this regard are chemically cross-linkable adhesives, the setting of which can be speeded up by heat. The adhesive is preferably applied to the surface of the projection of the stiffening ring and prior to joining the stiffening and lip rings, is in a pre-cross-linked chemical state. The parts can then be joined together cleanly and can be permanently bonded together in a heated press which quickly sets the adhesive.

Applications of the shaft sealing ring of the present invention relate to the sealing against leakage of liquids, gases or solids in the region of a shaft feedthrough of a machine.

The stiffening ring opens in U-fashion toward the sealed off medium and its outside surface is ground to an exact fit dimension of the receiving bore of the shaft housing so that a liquid, gas or solid tight press fit is obtained after the ring is pressed into the receiving bore.

In one particular embodiment of the invention, the projection of the stiffening ring has a conical taper angle $W_1$ of 44 degrees. The smallest diameter of this projection is 47.4 mm and is designed to seal a shaft with an outside diameter of 43 mm. The dimension $X_3$ is 3.8 mm.

The corresponding lip ring of this particular embodiment of the invention is produced by cutting off a rotation-symmetrical section from a pre-extruded and fully vulcanized hose. The material used is an acrylonitrile butadiene rubber with a Shore hardness of about 75 Shore A. The circular slot cut into the back end face has a maximum diameter of 49 mm and is conically tapered so that opposite surfaces of the profile of the slot form an angle $W_2$ of 24 degrees to each other. The perpendicular depth of the slot, $X_1$, is 5 mm and the length of the inside diameter wall, $X_2$, is 10 mm. The lip ring has an outside diameter of 51 mm, an inside diameter of 43 mm and an overall outside length of 11 mm.

The stiffening ring A and the lip ring B of this embodiment are cemented together in the area of the mutual contact surfaces 10 in accordance with the view in FIG. 3. In addition to the permanent connection of the two parts, deformation of the lip ring is obtained as shown in in the FIG. 3 view. The sealing lips arranged in the region of the end faces of the lip ring on both sides make elastic contact with the surface of the shaft to be sealed which has an outside diameter of 43 mm and a void in the region between the two sealing lips is developed as shown in 9 of FIG. 3. Several running tests of this embodiment confirmed excellent sealing action under typical liquid sealing conditions.

Another embodiment of the invention employs the above same parameters and in addition the projection of the stiffening ring has an undercut as shown in 11 of FIG. 4. The lip ring of this embodiment has correspondingly matched bead, as shown in 12 of FIG. 12, which snaps into the undercut upon the joining together of the two parts. In this assembly excellent sealing down to a pressure of 0.6 bar is ensured.

We claim:

1. A two part shaft sealing ring, which comprises:
an outer stiffening ring having a circular projection as the inside diameter surface, and
an elastically resilient, inner lip ring with front and back end faces and an inside diameter matching the outside diameter of the shaft to be sealed and having a concentric, circular slot in the back end face;
the profile of the circular slot matching the profile of the projection;
the mean diameter of the slot being smaller than the mean diameter of the projection;
the ratio of the depth of the slot to the length of the inside diameter wall of the lip ring being at most 0.6, and
the stiffening ring and lip ring being concentrically mated with the projection fitting into the slot.

2. A sealing ring according to claim 1 wherein the projection and circular slot are conically tapered.

3. A sealing ring according to claim 1 wherein the lip ring has the shape of a hollow cylinder.

4. A sealing ring according to claim 1 wherein the ratio of the mean diameter of the slot to the mean diameter of the projection is at least about 0.9.

5. A sealing ring according to claim 2 wherein the angle of the conical taper of the projection is identical to or larger than the angle of the conical taper of the slot.

6. A sealing ring according to claim 2 wherein the ratio of the depth of the slot to the length of the inside wall of the lip ring is at most 0.6, the ratio of the mean diameter of the slot to the mean diameter of the projection is at least about 0.9, and the angle of the conical taper of the projection is identical to or larger than the angle of the conical taper of the slot.

7. A sealing ring according to claim 1, 2 or 6 wherein the ratio of the mean diameter of the slot to the mean diameter of the projection is at least about 0.95.

8. A sealing ring according to claim 2 or 6 wherein the ratio of the angle of the conical taper of the projection to the angle of the conical taper of the slot is from about 1 to about 2.

9. A sealing ring according to claim 2 or 6 wherein the angle of the conical taper of the projection is from about 40° to about 48° and the angle of the conical taper of the slot is from about 20° to about 28°.

10. A sealing ring according to claim 1, 2 or 6 wherein the depth of the slot is equal to or larger than the length of the projection.

11. A sealing ring according to claim 1, 2 or 6 wherein the front face of the lip ring is beveled inward.

12. A sealing ring according to claim 1, 2 or 6 wherein the ratio of the depth of the slot to the length of the inside wall of the lip ring is at most 0.5 and the depth of the slot is larger than the length of the projection of the stiffening ring.

13. A sealing ring according to claim 2 or 6 wherein the angle of the conical taper of the projection is about 44° and the angle of the conical taper of the slot is about 24°.

14. A sealing ring according to claim 1, 2 or 6 wherein the outside surface of the projection is chemically bonded to the mated surface of the slot of the lip ring.

15. A sealing ring according to claim 1, 2 or 6 wherein at least one circular, concentric undercut is present on the outside surface of the projection of the stiffening ring.

16. A sealing ring according to claim 1, 2 or 6 wherein a circular concentric undercut is present on the outside surface of the projection and a bead is present on the outer surface of the slot, the profile of which matches the profile of the undercut.

17. A sealing ring according to claim 1, 2 or 6 wherein the stiffening ring is metal.

18. A sealing ring according to claim 1, 2 or 6 wherein the lip ring is vulcanized natural or synthetic rubber.

19. A sealing ring according to claim 1, 2 or 6 wherein the lip ring is cut from an extruded, vulcanized natural or synthetic rubber hose blank.

20. A sealing ring according to claim 1, 2 or 6 wherein the lip ring is made of natural or synthetic rubber having a Shore hardness of about 75 Shore A.

21. A two part shaft sealing ring, which comprises:
an outer stiffening ring having a circular projection as the inside diameter surface, and
an elastically resilient, inner lip ring with front and back faces and an inside diameter matching the outside diameter of the shaft to be sealed and having a concentric, circular slot in the back end face,
the diameter of the projection at a point about midway along its surface being larger than the diameter of the slot at a corresponding point, and
the stiffening ring and lip ring being concentrically mated with the projection fitting into the slot.

* * * * *